United States Patent

Hagano et al.

[11] Patent Number: 6,003,709
[45] Date of Patent: Dec. 21, 1999

[54] FUEL CAP

[75] Inventors: Hiroyuki Hagano; Masayuki Nakagawa, both of Aichi, Japan

[73] Assignee: Toyoda Gosei Co., Ltd., Aichi, Japan

[21] Appl. No.: 08/925,077

[22] Filed: Sep. 8, 1997

[30] Foreign Application Priority Data

Sep. 9, 1996 [JP] Japan .................................. 8-238087

[51] Int. Cl.⁶ .................................................. B65D 90/22
[52] U.S. Cl. ..................................... 220/88.1; 220/203.24; 220/303; 220/304; 220/375; 220/DIG. 33
[58] Field of Search .................... 220/203.23, 203.24, 220/203.26, 88.1, 303, 304, 375, DIG. 33

[56] References Cited

U.S. PATENT DOCUMENTS

| | | |
|---|---|---|
| 4,177,931 | 12/1979 | Evans . |
| 4,597,504 | 7/1986 | Witt ........................................ 220/88.1 |
| 4,730,652 | 3/1988 | Bartholomew . |
| 4,854,471 | 8/1989 | Kasugai et al. . |
| 4,974,307 | 12/1990 | Uebayashi et al. . |
| 5,203,466 | 4/1993 | Kasugai et al. . |
| 5,395,004 | 3/1995 | Griffin et al. ............................ 220/295 |
| 5,520,300 | 5/1996 | Griffin .................................... 220/210 |
| 5,540,347 | 7/1996 | Griffin .................................. 220/203.23 |
| 5,615,793 | 4/1997 | Muller .................................... 220/295 |

Primary Examiner—Stephen K. Cronin
Attorney, Agent, or Firm—Pillsbury Madison & Sutro LLP

[57] ABSTRACT

A fuel cap which is to be attached to a filler neck which is open for a fuel supply has a closure which is to be fitted to the filler neck and which is made of a resin, and a shell which covers an upper part of the closure and which is made of a resin. The shell is formed by an electrically conductive resin material which has a surface resistance of $10^{11}$ Ω or less, or has a volume resistance of $10^{11}$ Ω·cm or less, and a discharge rib portion is integrally formed on the inner peripheral face of the shell. In a state where the fuel cap is attached to the filler neck, the distance between the discharge rib portion and the filler neck or the body of an automobile is 3 mm or less.

19 Claims, 6 Drawing Sheets

FUEL CAP

BACKGROUND OF THE INVENTION

1. Field of the Invention

The invention relates to a fuel cap which is to be attached to a filler neck which is open for a fuel supply, and particularly to a fuel cap through which static electricity accumulated in the human body or clothes of a person can be discharged.

2. Description of the Related Art

A conventional fuel cap is configured in the following manner as shown in FIG. 1.

A fuel cap 2 comprises a closure 3 which is formed by a synthetic resin such as polyacetal, and a shell 14 which covers the upper part of the closure 3 and which is formed by a synthetic resin such as nylon.

The closure 3 comprises a cylinder portion 4 which is substantially cylindrical, and a ceiling portion 8 which is disposed so as to close an inner periphery of the cylinder portion 4 at a substantially center position in the vertical direction. A flow path hole 9 is opened at the center of the ceiling portion.

A thread portion 5 which is to be screwed into a filler neck 1 is formed on the outer periphery of the cylinder portion 4. A flange portion 6 which is engaged with a shell 14 is formed on the outer periphery of the upper part of the cylinder portion 4. A seal ring 7 is attached to the lower face of the flange portion 6.

A valve element 10 which constitutes a negative pressure valve is disposed on the side of the lower face of the ceiling portion 8 in the cylinder portion 4. The valve element 10 is held by a valve element holding plate 11 which is upward urged by a coil spring 12.

The coil spring 12 is supported by a spring seat plate 13.

As shown in FIG. 1, the thus configured fuel cap is to be attached to the filler neck 1 which is disposed in a fitting hole 17 formed in a mounting panel 16 below a fuel lid 15 of an automobile. In the figure, 18 designates the body of the automobile, 19 designates a fuel supply port, and 20 designates a main unit of the body of the automobile.

However, the conventional fuel cap is not provided with a function of, each time when the cap is opened or closed, discharging static electricity accumulated in the human body or clothes of a person.

SUMMARY OF THE INVENTION

In view of the above situation, it is an object of the invention to provide a fuel cap in which static electricity accumulated in the human body or clothes of a person can be discharged easily and surely.

In order to solve the problem, the fuel cap of the invention is provided in the following manner.

According to a first aspect of the invention, there is provided a fuel cap which is to be attached to a filler neck which is open for a fuel supply, comprising: a closure to be fitted to the filler neck; and a shell covering an upper part of the closure and being made of a resin and having a discharge rib portion being formed on an inner peripheral face of the shell; wherein the resin of the shell has a surface resistance of $10^{11}$ Ω or less, or has a volume resistance of $10^{11}$ Ω·cm or less, and a distance between the discharge rib portion and the filler neck or a body to which the filler neck is attached is 3 mm or less in a state where the fuel cap is attached to the filler neck.

According to a second aspect of the invention, there is provided a fuel cap which is to be attached to a filler neck which is open for a fuel supply, comprising: a closure to be fitted to the filler neck; and a shell covering an upper part of the closure and being made of a resin and having a discharge rib portion being formed on an inner peripheral face of the shell; wherein the resin of the shell has a surface resistance of $10^{11}$ Ω or less, or has a volume resistance of $10^{11}$ Ω·cm or less, and the shell is connected to the filler neck or a body to which the filler neck is attached by an electrically conductive member.

According to a third aspect of the invention, there is provided a fuel cap which is to be attached to a filler neck which is open for a fuel supply, comprising: a closure to be fitted to the filler neck; and a shell covering an upper part of the closure; wherein the closure and the shell are formed by an electrically conductive resin material which has a surface resistance of $10^{11}$ Ω or less, or has a volume resistance of $10^{11}$ Ω·cm or less.

DETAILED DESCRIPTION OF THE PREFERRED EMBODIMENTS

Figure 1:
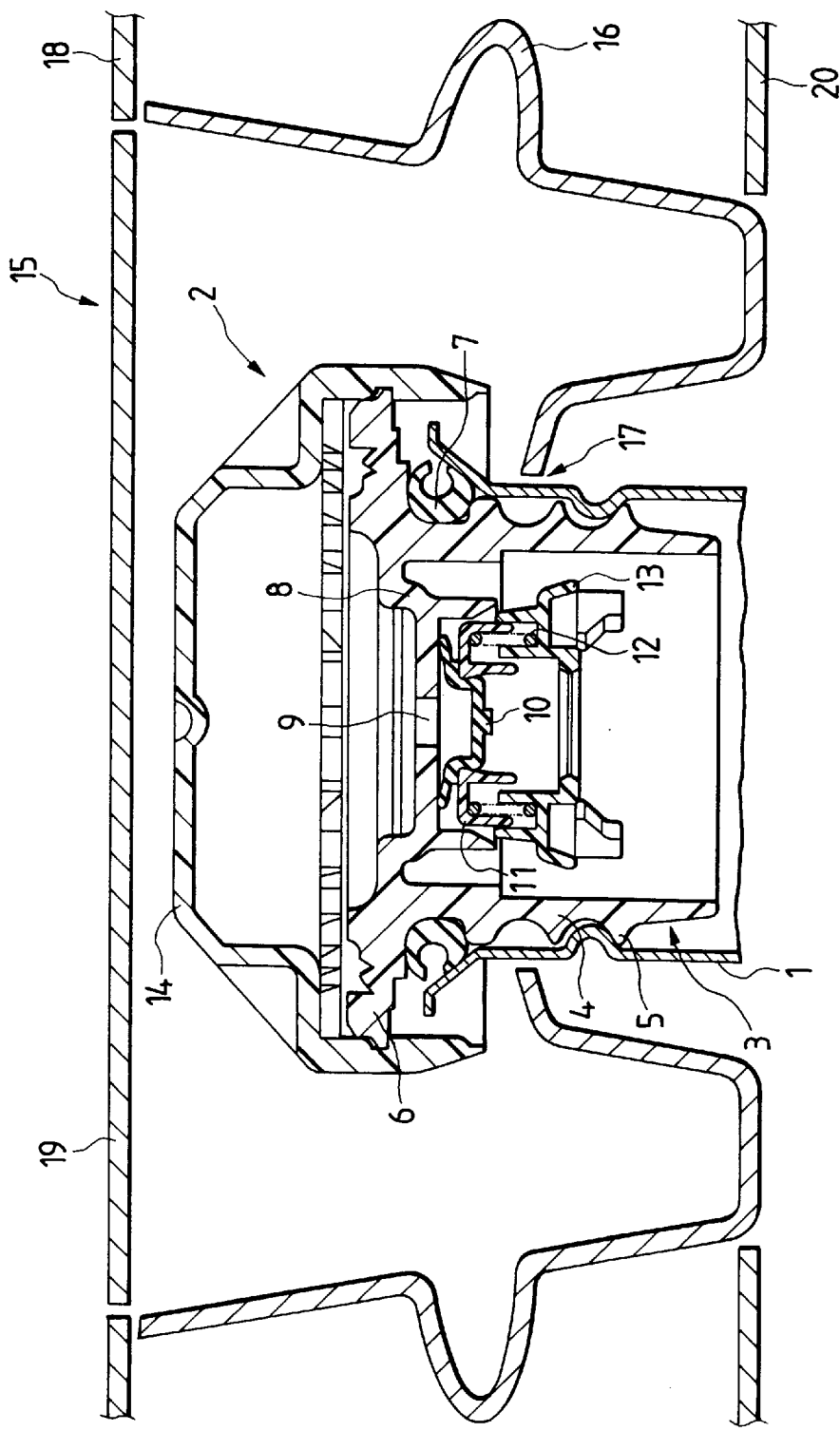
FIG. 1 is a side sectional view of a fuel cap of the conventional art.

Hereinafter, embodiments of the invention will be described with reference to the accompanying drawings.

The components which are identical with those of the conventional art example are designated by the same reference numerals, and their description is often omitted.

1st Embodiment

Figure 2A:
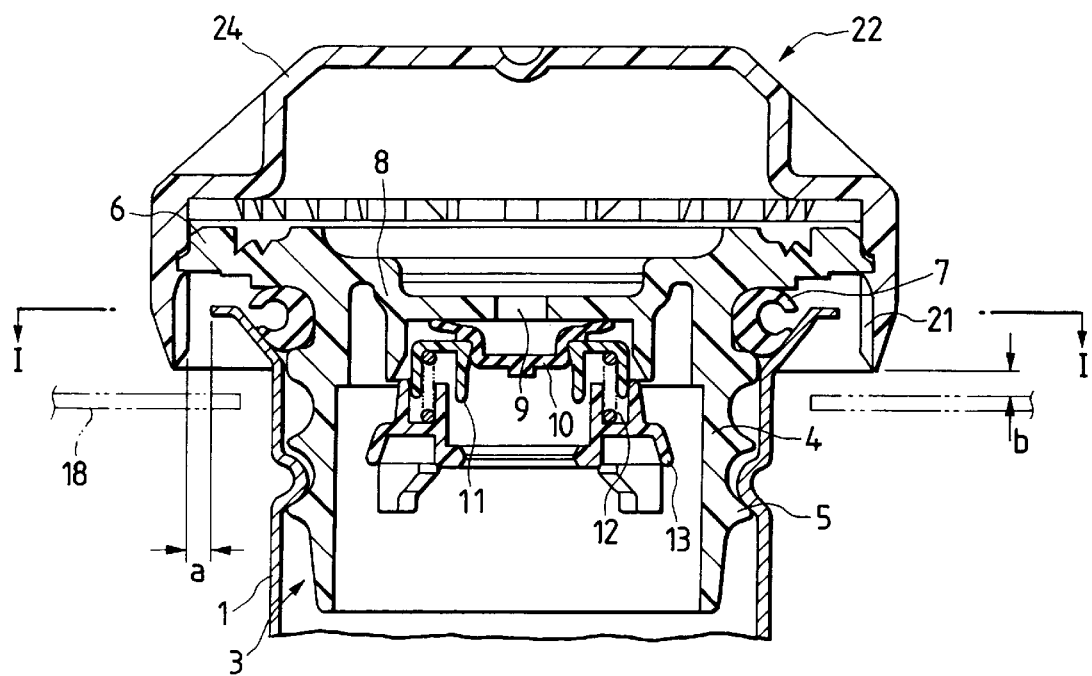
FIG. 2(a) is side sectional view of a first embodiment of the fuel cap of the invention.
Figure 2B:
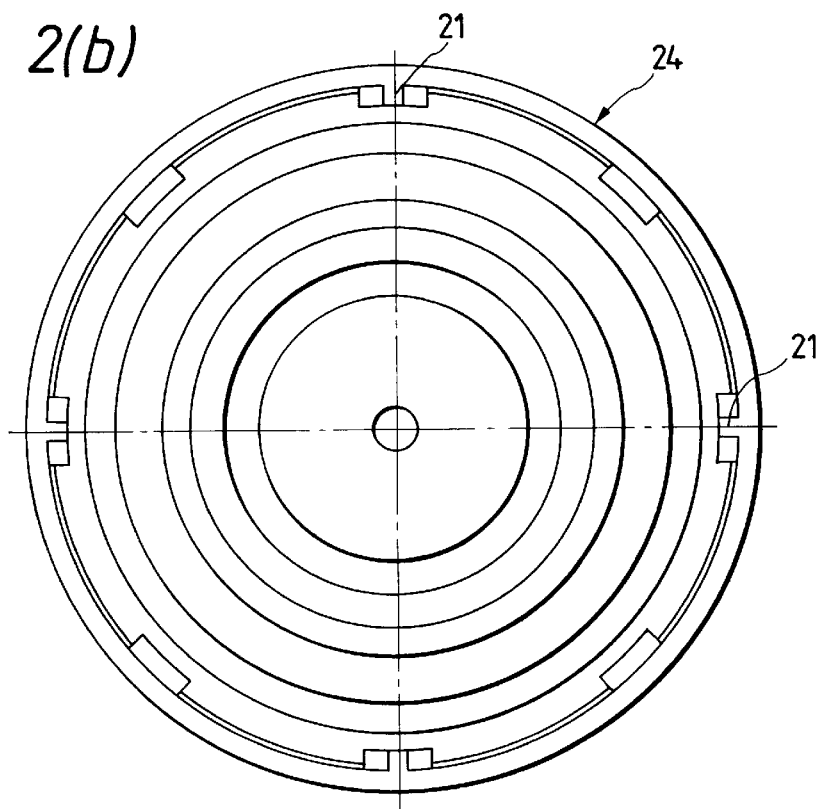
FIG. 2(b) is a plan sectional view taken along the line I—I in FIG. 2(a)

FIGS. 2(a) and 2(b) show a first embodiment of a fuel cap of the invention.

In the fuel cap 22 of the embodiment, a shell 24 is formed by an electrically conductive resin. Plural discharge rib portions 21 are formed on the inner peripheral face of the shell 24 so as to oppose the filler neck 1 under the state where the shell 24 is fitted onto the closure 3. The distance a between each of the discharge rib portions 21 and the filler neck 1 is set to be 3 mm or less (preferably, 1 mm or less), thereby enabling a discharge from a side portion of each discharge rib portion 21 to the filler neck 1 to occur.

In the case where the body 18 is disposed around the filler neck 1 as shown by the two-dot chain lines, the distance b between the tip end of each discharge rib portion 21 and the body 18 is set to be 3 mm or less (preferably, 1 mm or less), thereby enabling a discharge from the tip end of each discharge rib portion 21 to the body 18 to occur.

An example of the material for forming the shell is a mixture in which carbon, a conductive filler, or conductive whiskers are mixed with a resin such as nylon or polyacetal so as to have a surface resistance of $10^{11}$ Ω or less, or have a volume resistance of $10^{11}$ Ω·cm or less. Alternatively, the surface resistance of $10^{11}$ Ω or less may be attained by, after the shell is formed by the above-mentioned resin or the other resin which being capable of preserving the shape of the shell, applying or printing a conductive coating material to the surface of the shell. As the conductive coating material, a coating material to which a conductive material such as conductive carbon, Ni, Ag, Au, or Cu is added may be used.

For example, the shell is molded as follows. That is, the conductive carbon is added to polyamide resin or polypropylene resin so as to set the volume resistance to about $10^5$ Ω·cm, and the resin material is molded by an ordinary injection-molding.

Hereupon, the conductive carbon, for example, may be ACETYLENE BLACK manufactured by DENKI KAGAKU KOGYO CO., LTD. The conductive coating material, for example, may be DOTITE SH-3A (epoxy resin system coating) manufactured by FUJIKUA KASEI CO, LTD. The volume resistance of these materials is 1 Ω·cm.

A single discharge rib portion 21 may be used. In order to improve the discharge efficiency, however, it is preferable to use plural discharge rib portions arranged in the circumferential direction as shown in FIG. 2(b).

Incidentally, the discharge rib portion 21 has the same conductive characteristic as that of the shell 24. That is, the rib portion 21 has a surface resistance of $10^{11}$ Ω or less, or have a volume resistance of $10^{11}$ Ω or less. The discharge rib portion 21 may be integrally formed with or separated from the shell 24.

2nd Embodiment

Figure 3:
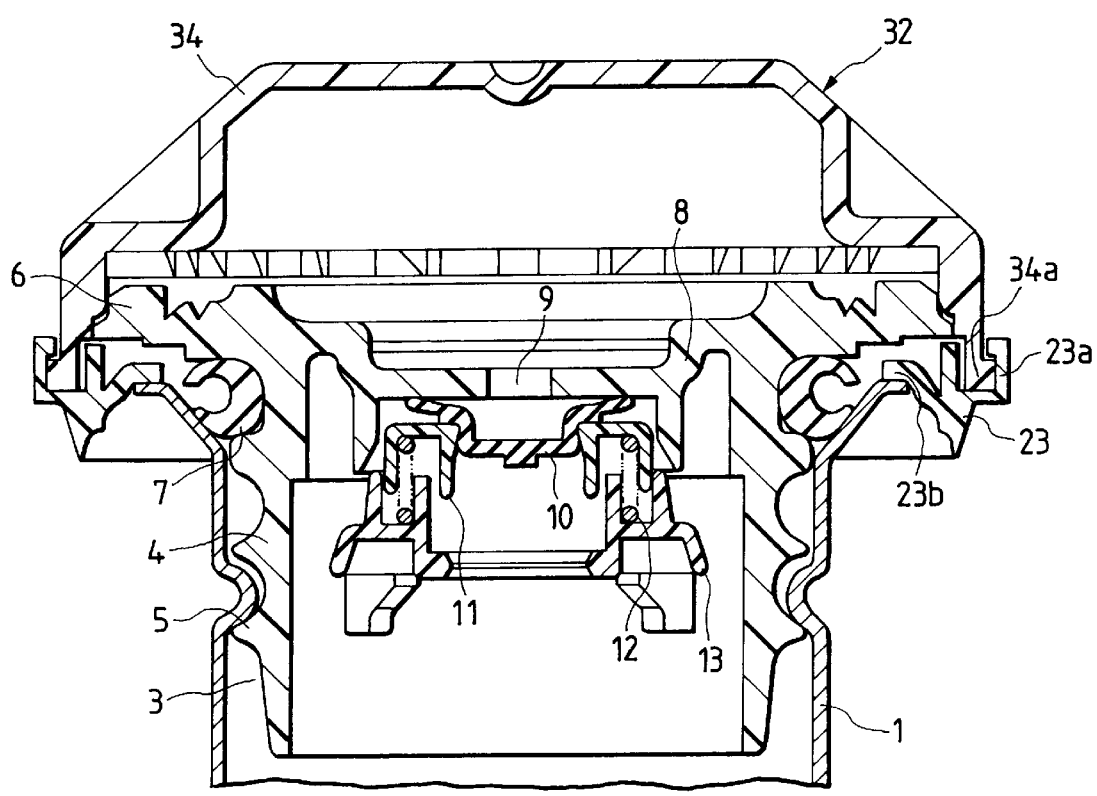
FIG. 3 is a side sectional view of a second embodiment of the fuel cap of the invention.

FIG. 3 shows a second embodiment of the fuel cap of the invention.

In the fuel cap 32 of the embodiment, a shell 34 is formed by a conductive resin in the same manner as the embodiment described above, and a retainer 23 which is formed by a conductive resin is disposed as a conductive member which connects the shell 34 with the filler neck 1.

A fitting projection 34a is formed along the outer periphery of an end part of the shell 34. The retainer 23 having a fitting recess 23a into which the fitting projection 34a is fitted is fitted into the tip end of the shell 34. A fin 23b is integrated with the retainer 23 over the circumferential direction of the retainer 23 so as to abut against the filler neck 1, thereby enabling a direct discharge from the retainer 23 to the filler neck 1 to occur. Of course, plural fins to be arranged in the circumferential direction of the retainer 23 may be used as similar to the aforementioned discharge rib portions.

Preferably, the filler neck 1 and the fin 23b is contacted with each other. Even when they are separated from each other, however, a discharge is enabled as far as the distance between them is 3 mm or less (preferably, 1 mm or less).

Figure 4:
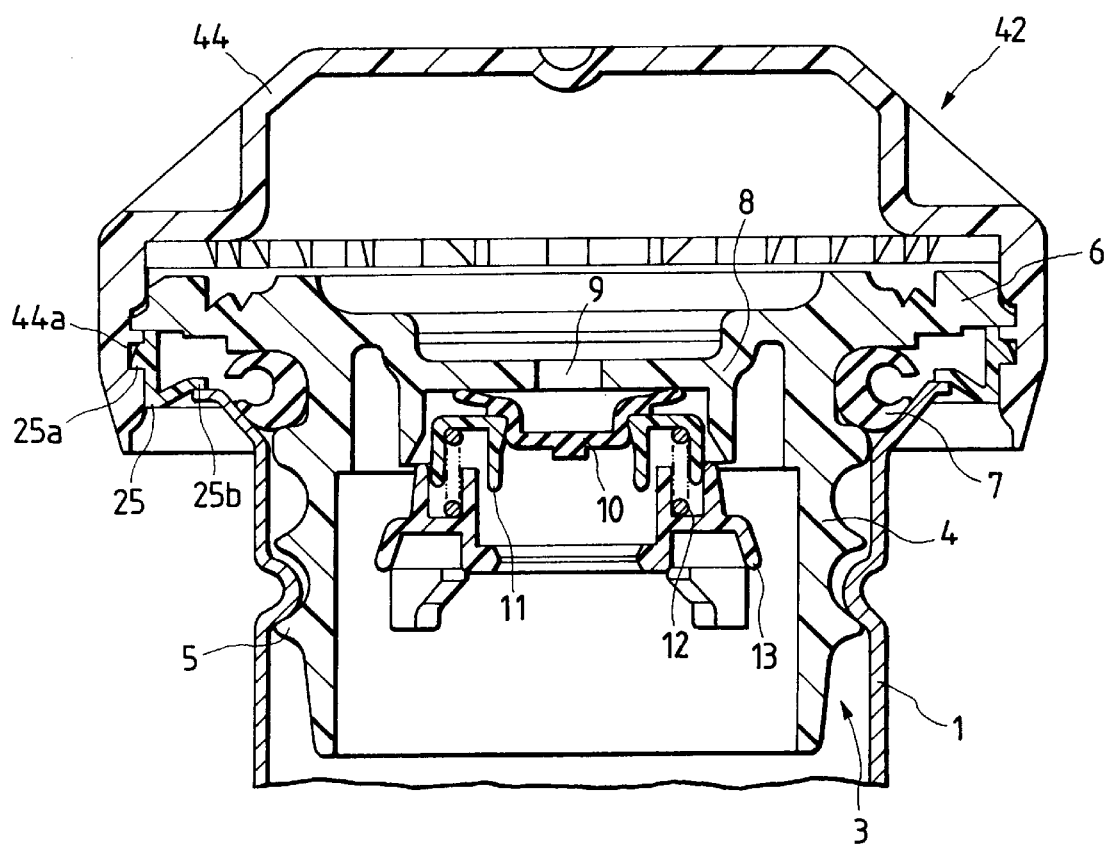
FIG. 4 is a side sectional view of a modification of the second embodiment of the invention.

A fuel cap 42 having the configuration shown in FIG. 4 may be used. In the fuel cap 42, a fitting recess 44a is formed along the inner periphery of a shell 44. A retainer 25 which is formed by a conductive resin is fitted to the shell 44 by means of a fitting projection 25a which is fitted into the fitting recess 44a. A fin 25b is integrally formed on the retainer 25 so as to abut against the filler neck 1.

Also in this case, preferably, the filler neck 1 and the fin 25b is contacted with each other. Even when they are separated from each other, therefore, a discharge is enabled as far as the distance between them is 3 mm or less (preferably, 1 mm or less).

3rd Embodiment

Figure 5:
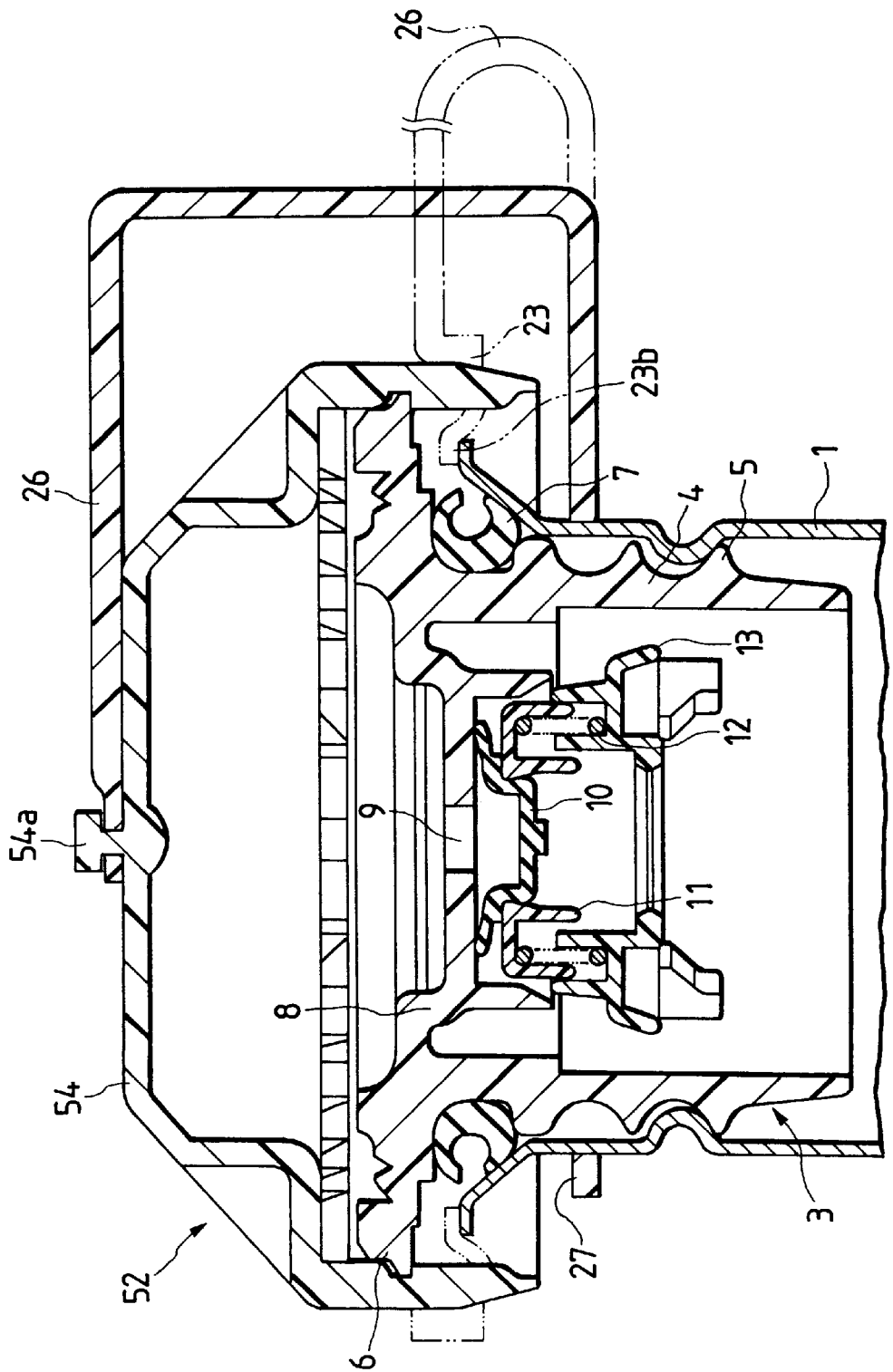
FIG. 5 is a side sectional view of a third embodiment of the fuel cap of the invention.

FIG. 5 shows a third embodiment of the fuel cap of the invention.

In the fuel cap 52 of the embodiment, a shell 54 is formed by a conductive resin in the same manner as the embodiment described above, and a string-like member 26 which is formed by a conductive resin or conductive rubber is disposed as a conductive member which connects a substantially center position of a handle portion of the shell 54 with the filler neck 1, thereby enabling a direct discharge from the string-like member 26 to the filler neck 1 to occur.

In the embodiment, the materials mentioned above may be used as the conductive resin. Examples of the conductive rubber are a mixture in which carbon, a conductive filler, or conductive whiskers are mixed with a rubber material such as natural rubber or synthetic rubber so as to have a surface resistance of $10^{11}$ Ω or less, or have a volume resistance of $10^{11}$ Ω·cm or less, and a material in which the surface resistance of $10^{11}$ Ω or less is attained by applying or printing a conductive coating material to the surface of the string-like member 26. The conductive rubber, for example, may be TCM5406 (silicone rubber system) manufactured by TOSHIBA SILICONE CO, LTD of which the volume resistance is 1 Ω·cm.

The string-like member 26 is fixed to the shell 54 and the filler neck 1 in the following manner. The member is fixed to the shell 54 by using a fixing member 54a which is integrated with the shell 54. The fixation to the filler neck 1 is realized by fitting an annular fitting portion 27 the inner diameter of which is substantially equal to the outer diameter of the filler neck 1, onto the filler neck 1. The fitting portion 27 is integrated with the string-like member 26.

The string-like member 26 is conventionally used for connecting a filler neck with a shell so that the shell is prevented from missing during a fuel supply. Usually, such a member is called "a tether."

As shown by the two-dot chain lines in FIG. 5, the retainer 33 which is used in the second embodiment may be integrated with the string-like member 26, and the resulting integral member may be similarly connected to the filler neck 1.

Figure 6:
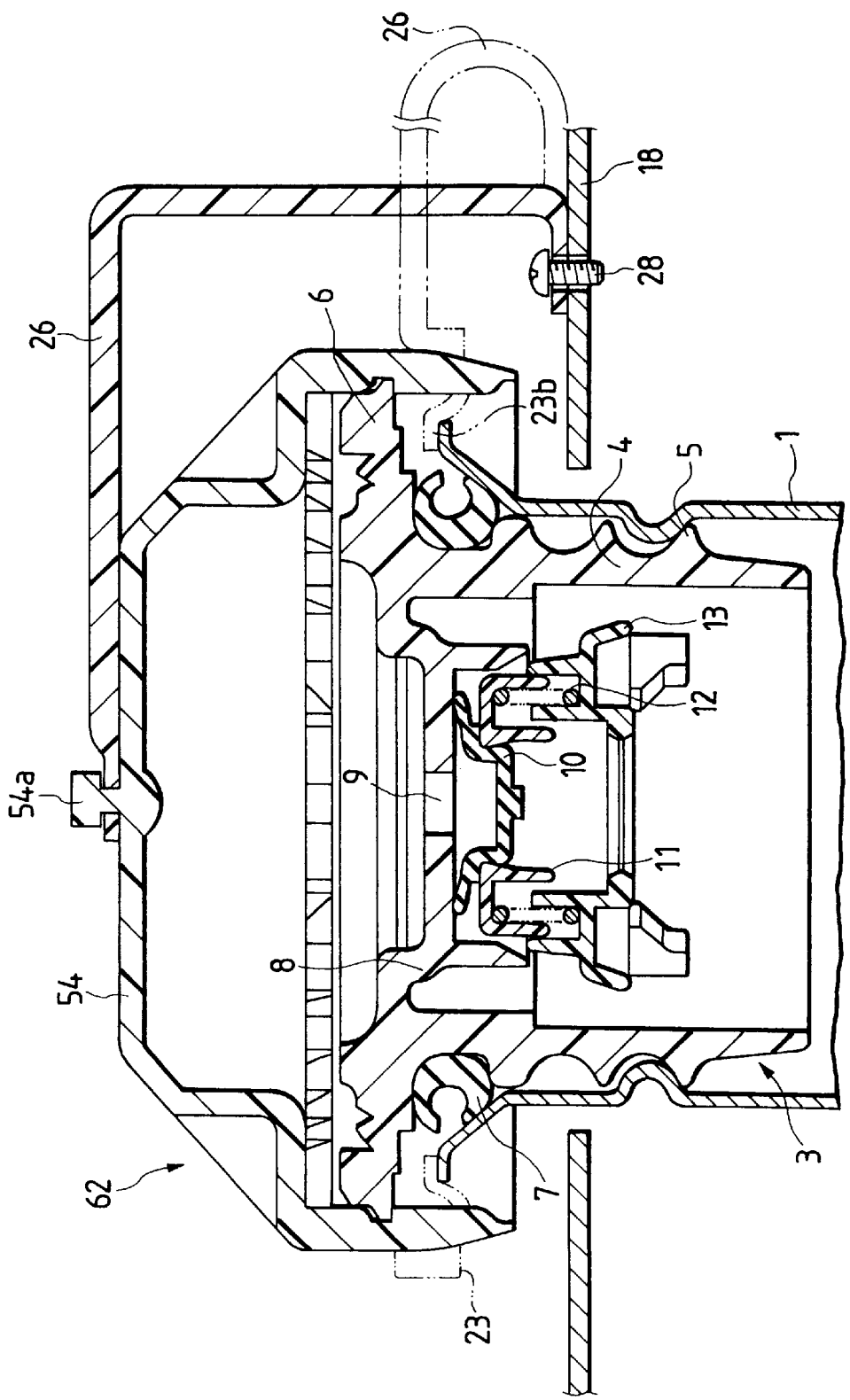
FIG. 6 is a side section view of a modification of the third embodiment of the invention.

In the case where the body 18 is disposed around the filler neck 1, as shown in FIG. 6, the string-like member 26 may be directly fixed to the body 18 by a screw, so that a discharge is directly conducted from the string-like member 26 to the body 18.

Also in this modification, the retainer 23 which is used in the second embodiment may be integrated with the string-like member 26, and the resulting integral member may be fixed to the body 18. In this case, the fin 23b formed on the retainer 23 is in close proximity to the filler neck 1, and hence a discharge can be conducted to both the filler neck 1 and the body 18.

In the embodiment, the string-like member is formed by a conductive resin or conductive rubber. Alternatively, the closure 3 may be formed by a conductive resin, in place of forming the string-like member 26 by a conductive material. In the alternative, static electricity is directly discharged from the shell 54 to the filler neck 1 via the closure 3. Further, the string-like member may be also formed by a metal chain.

The fuel cap of the invention which is configured as described above attains the following effects.

In the fuel cap of the present invention, the shell is formed by an electrically conductive resin, and the distance between the rib portion disposed on the inner peripheral face of the shell and the filler neck or the body is 3 mm or less. During a fuel supply, therefore, static electricity accumulated in the human body or clothes of a person can be surely discharged for a constant time period.

Further, in the fuel cap in the present invention, the shell is formed by an electrically conductive resin material, and connected to the filler neck or the body via an electrically conductive member. Therefore, a discharge can be conducted more surely.

In the aforementioned embodiments, the fuel cap is applied to the automobile body. However, the present invention can be applied to various kinds of vehicles other than the automobiles.

What is claimed is:

1. A fuel cap which is to be attached to a filler neck which is open for a fuel supply, comprising:

a closure to be fitted to said filler neck and being made of a resin;

a shell which covers an upper part of said closure and comprising an electrically conductive resin material which has a surface resistance of $10^{11}$ Ω or less; and discharging member for discharging static electricity accumulated in an operator from said shell to said filler neck or a body to which said filler neck is attached.

2. The fuel cap according to claim 1, wherein said discharging member comprises a discharge rib portion being formed on an inner peripheral face of said shell, and a distance between said discharge rib portion and said filler neck or said body is 3 mm or less when the fuel cap is attached to said filler neck.

3. The fuel cap according to claim 1, wherein said discharging member comprises a retainer being formed by an electrically conductive resin material or rubber, and being disposed between said closure and said filler neck, said retainer has at least one fin which is brought into contact with said filler neck or very adjacent to said filler neck with a distance 3 mm or less when the fuel cap is attached to said filler neck.

4. The fuel cap according to claim 1, wherein said discharging member comprises a string-like member connecting said shell to said filler neck or said body, and being formed by an electrically conductive resin material.

5. The fuel cap according to claim 1, wherein said closure comprises an electrically conductive resin which has a surface resistance of $10^{11}$ Ω or less, and serves as said discharging member.

6. The fuel cap according to claim 1, wherein said closure comprises an electrically conductive resin which has a volume resistance of $10^{11}$ Ω·cm or less, and serves as said discharging member.

7. The fuel cap according to claim 1, wherein said electrically conductive resin material of said shell is applied or printed to a surface of said shell.

8. A fuel cap which is to be attached to a filler neck which is open for a fuel supply, comprising:

a closure to be fitted to said filler neck and being made of a resin;

a shell which covers an upper part of said closure and comprising an electrically conductive resin material which has a volume resistance of $10^{11}$ Ω·cm or less; and discharging member for discharging static electricity accumulated in an operator from said shell to said filler neck or a body to which said filler neck is attached.

9. The fuel cap according to claim 8, wherein said discharging member comprises a discharge rib portion being formed on an inner peripheral face of said shell, and a distance between said discharge rib portion and said filler neck or said body is 3 mm or less when the fuel cap is attached to said filler neck.

10. The fuel cap according to claim 9, wherein said discharging member comprises a string-like member connecting said shell to said filler neck or said body, and being formed by an electrically conductive resin material.

11. The fuel cap according to claim 8, wherein said discharging member comprises a retainer being formed by an electrically conductive resin material or rubber, and being disposed between said closure and said filler neck, said retainer has at least one fin which is brought into contact with said filler neck or very adjacent to said filler neck with a distance 3 mm or less when the fuel cap is attached to said filler neck.

12. The fuel cap according to claim 8, wherein said closure comprises an electrically conductive resin which has a surface resistance of $10^{11}$ Ω or less, and serves as said discharging member.

13. The fuel cap according to claim 8, wherein said closure comprises an electrically conductive resin which has a volume resistance of $10^{11}$ Ω·cm or less, and serves as said discharging member.

14. A fuel cap which is to be attached to a filler neck which is open for a fuel supply, comprising:

a closure to be fitted to said filler neck; and a shell covering an upper part of said closure and being made of a resin and having a discharge rib portion being formed on an inner peripheral face of said shell;

wherein the resin of said shell has a surface resistance of $10^{11}$ Ω or less, or has a volume resistance of $10^{11}$ Ω·cm or less, and a distance between said discharge rib portion and said filler neck or a body to which said filler neck is attached is 3 mm or less in a state where the fuel cap is attached to said filler neck.

15. The fuel cap according to claim 14, wherein plural discharge rib portions are provided.

16. A fuel cap which is to be attached to a filler neck which is open for a fuel supply, comprising:

a closure to be fitted to said filler neck; and a shell covering an upper part of said closure and being made of a resin and having a discharge rib portion being formed on an inner peripheral face of said shell;

wherein the resin of said shell has a surface resistance of $10^{11}$ Ω or less, or has a volume resistance of $10^{11}$ Ω·cm or less, and said shell is connected to said filler neck or a body to which said filler neck is attached by an electrically conductive member.

17. The fuel cap according to claim 16, wherein a surface resistance of said electrically conductive member is $10^{11}$ Ω or less.

18. The fuel cap according to claim 16, wherein a volume resistance of said electrically conductive member is $10^{11}$ Ω·cm or less.

19. A fuel cap which is to be attached to a filler neck which is open for a fuel supply, comprising:

a closure to be fitted to said filler neck; and a shell covering an upper part of said closure;

wherein said closure and said shell are formed by an electrically conductive resin material which has a surface resistance of $10^{11}$ Ω or less, or has a volume resistance of $10^{11}$ Ω·cm or less.

* * * * *

UNITED STATES PATENT AND TRADEMARK OFFICE
CERTIFICATE OF CORRECTION

PATENT NO. : 6,003,709
DATED : December 21, 1999
INVENTOR(S) : Hiroyuki HAGANO; Masayuki NAKAGAWA It is certified that error appears in the above-indentified patent and that said Letters Patent is hereby corrected as shown below:

On the title page, item:

"[22] Filed:   Sep. 8, 1997"

to

--[22] Filed:   Sep. 9, 1997--.

Signed and Sealed this

Sixth Day of March, 2001

Attest:

NICHOLAS P. GODICI

Attesting Officer    Acting Director of the United States Patent and Trademark Office